United States Patent [19]

Speer et al.

[11] Patent Number: 5,000,865
[45] Date of Patent: Mar. 19, 1991

[54] METHOD FOR THE PRODUCTION OF ALKALINE-EARTH FERRITES AND LEAD FERRITES FOR MEMORY CORES

[75] Inventors: Dietrich Speer, Hanau; Guenter Halbritter, Rodenbach; Peter Kleinschmit, Hanau, all of Fed. Rep. of Germany

[73] Assignee: Degussa Aktiengesellschaft, Frankfurt am Main, Fed. Rep. of Germany

[21] Appl. No.: 370,837

[22] Filed: Jun. 23, 1989

[30] Foreign Application Priority Data

Jul. 25, 1988 [DE] Fed. Rep. of Germany ....... 3825203

[51] Int. Cl.$^5$ .............................................. C04B 35/26
[52] U.S. Cl. .............................. 252/62.63; 252/62.59; 423/594
[58] Field of Search ................... 252/62.63, 62.59; 423/594, 596, 138, 139, 140, 150, 58, 59, 60, 61

[56] References Cited

U.S. PATENT DOCUMENTS

| | | | |
|---|---|---|---|
| 4,138,466 | 2/1979 | Meussdoerffer et al. | 423/61 |
| 4,571,885 | 6/1987 | Gaud et al. | 252/62.59 |
| 4,585,568 | 4/1986 | Nagai et al. | 252/62.59 |
| 4,820,433 | 4/1989 | Yamamoto | 252/62.57 |

*Primary Examiner*—Mark L. Bell
*Assistant Examiner*—Chris Gallo
*Attorney, Agent, or Firm*—Beveridge, DeGrandi & Weilacher

[57] ABSTRACT

Platelike alkaline-earth ferrites and lead ferrites for memory cores are produced from impure initial substances by decomposing the initial substances with a molten, basic alkali compound, and the precursor separated off after dissolution in water is annealed for 0.5 to 6 hours at 600° to 950° C.

11 Claims, No Drawings

METHOD FOR THE PRODUCTION OF ALKALINE-EARTH FERRITES AND LEAD FERRITES FOR MEMORY CORES

INTRODUCTION AND BACKGROUND

The present invention relates to a method for the production of platelike, finely divided, doped alkaline-earth ferrites and lead ferrites for memory cores. These products are produced from crude ferrites or impure, ceramic raw materials by means of the dissolution of the initial starting substances and by tempering the precursor obtained thereby.

Compared to other magnetic pigments such as e.g. chromium dioxide and iron oxide, the doped alkaline-earth ferrites and lead ferrites exhibit advantages, among other features, regarding temperature and moisture resistance and the recording density or data density per $cm^2$. The good magnetic properties of such products are achieved by the hexagonal, platelike shape, the fineness and by the doping with other metal ions.

According to conventional production methods for forming ferrites from ceramic raw materials, e.g. iron oxide, alkaline-earth oxide or alkaline-earth carbonate, by sintering the mixtures, the crude ferrite products produced at high temperatures exhibit large crystallites. These products suffer the drawback that the large crystallites are quite intergrown with each other. As a result, such ferrites are unsuitable for memory devices.

Barium ferrites suitable for memory cores were obtained in the past either by melting the initial oxides in borate glasses at very high temperatures, by a subsequent tempering of the glass and dissolving out the ferrite crystallites with acids (JP 86/236104) or by precipitating hydroxides from pure chloride solutions or nitrate solutions of the participating elements and treatment of the alkaline solution in an autoclave (JP 86/295236). In EP-OS 186603, barium hydroxide octahydrate with sodium ferrite is used as the initial substance for an autoclave treatment.

Further information concerning ferrites and their uses is found in Kirk-Othmer, Encyclopedia of Chemical Technology, 3rd Edition, pp. 881–902 relied on and incorporated herein by reference.

SUMMARY OF THE INVENTION

An object of the present invention therefore is to provide a method for the production of platelike, finely, doped alkaline-earth ferrites and lead ferrites as memory carriers. In its broadest aspects, the method of the invention is carried out by dissolving the initial starting substances; namely, crude ferrites or impure, ceramic raw materials and then annealing the precursor obtained thereby. In this manner, a product of defined composition (doping) very well-suited for memory cores can be obtained in spite of the use of impure, inexpensive initial starting materials.

The above and other objects of the invention are achieved by a method wherein dissolution of the initial starting substances takes place by means of a decomposition or digestion with molten, basic alkali compounds employed in excess. The precursor is obtained after the dissolution of the melt in water. After being filtered off the precursor is annealed at temperatures between 600° and 950° C. for 0.5 to 6 hours.

In a further aspect of the invention, the method is carried out by melting the crude ferrite or ferrite forming materials with alkaline compounds such as sodium hydroxide at elevated temperatures to form a molten melt. The temperature is selected to form a homogeneous melt. Thereafter, the molten melt is held at an elevated temperature to achieve adequate decomposition. The molten melt is then dissolved in water to form a suspension which is followed by filtering. Any suitable filtering apparatus can be used.

It is preferable to use sodium hydroxide for the decomposition at temperatures above 320° C. and to maintain the melt at temperatures above 200° C. up to 24 hours. For example, melt decomposition temperatures of 800° C. to 1200° C. are typical. The melt is then held at for example 320° to 500° C. for 6–24 hours.

It is also advantageous to subject the suspension obtained after the dissolution of the melt in water to an autoclave treatment at 120° to 400° C. for 2 to 6 hours.

Ferrites of the general formula $AFe_{12-x-y}M_xSn_yO_{19}$ can be produced with this method in which formula:

A = Ba, Sr, Ca and/or Pb,
M = Mn, Co, Cu, Zn, Ni, In, Cr, Ti, Ge, Zr, Y, Nb, Ta, Mo and/or W
x = 0 to 3
y = 0 to 1

Platelike, finely divided crystallites in a size range up to 1 $\mu$m are obtained.

Hence, a further object of the invention is to provide such ferrite products as described above.

DETAILED EMBODIMENTS OF THE INVENTION

The following examples are intended to illustrate the present invention in more detail:

EXAMPLE 1

100 g of a crude ferrite of the formula: $Ba\,Fe_{11}Co_{0.5}Ti_{0.5}O_{19}$ are melted with 500 g sodium hydroxide at 800° C. and annealed for 6 hours at 500° C. The melt is dissolved in water, the ferrite precursor, which consists of agglomerates of disklike crystallites with a diameter of approximately 0.0035 $\mu$m, filtered off and annealed for 1 hour at 900° C. The hexagonal barium ferrite crystals produced exhibit a diameter of below 1 $\mu$m and a diameter-thickness ratio of greater than 6.

EXAMPLE 2

Instead of using the crude ferrite of Example 1 as the starting material, the same product as in Example 1 is obtained from a mixture of 79 g $Fe_2O_3$, 17.76 g $BaCO_3$, 3.61 g $Co_3O_4$ and 3.59 g $TiO_2$ when this mixture is treated according to Example 1. The initial products had only an industrial purity hereby. The $Fe_2O_3$ contained e.g. approximately 5% impurities.

EXAMPLE 3

A melt according to Example 1 is dissolved in water and the suspension obtained is treated 6 hours at 190° C. in an autoclave. The particle diameter of the ferrite precursor was then approximately 0.0075 $\mu$m. After a two-hour annealing at 900° C., the barium ferrite crystals exhibited a diameter of approximately 1 $\mu$m and a diameter-thickness ratio greater than 6.

EXAMPLE 4

A melt according to Example 1 or 2 is annealed for 6 hours at 320° C. The particle size of the ferrite precursor was also approximately 0.0035 $\mu$m here.

EXAMPLE 5

100 g impure strontium ferrite with the composition $SrFe_{12}O_{19}$ or the amount consisting of 13.9 g $SrCO_3$ and 90.24 g $Fe_2O_3$ corresponding to this composition are melted with 600 g sodium carbonate at 1200° C., dissolved in 0.5 l water and treated at 240° C. in an autoclave for 6 hours. The separated ferrite precursor is then annealed for 6 hours at 950° C. The strontium ferrite crystals produced thereby exhibit a diameter of below 1 μm.

By following the same steps as in the above examples but with different starting materials, the corresponding compounds wherein A is Ca and/or Pb and M is Mn, Cu, Zn, Ni, In, Cr, Ge, Zr, Y, Nb, Ta, Mo and/or W can be prepared.

The alkaline-earth ferrites obtained in this manner could all be used for memory cores.

Further variations and modifications of the invention will be apparent to those skilled in the art from the foregoing and are intended to be encompassed by the claims appended hereto.

German priority application P 38 25 203.1-41 is relied on and incorporated herein by reference.

We claim:

1. A method for the production of platelike, finely divided, alkaline-earth ferrites and lead ferrites for memory cores comprising dissolving the corresponding crude ferrite or impure, ceramic raw material in an alkali at elevated temperature to form a decomposition molten melt with an alkali compound in excess, dissolving the melt in water to obtain a precursor, filtering off said precursor and annealing the precursor thereby obtained, at temperatures between 600° and 950° C. for 0.5 to 6 hours.

2. The method according to claim 1, wherein sodium hydroxide is the alkali used for the decomposition at temperatures above 320° C. and further maintaining the melt at temperatures above 200° C. up to 24 hours.

3. The method according to claim 1, wherein after dissolving the melt in water, the suspension obtained thereby is subjected to an autoclaving at 120° to 400° C. for 2 to 6 hours.

4. The method according to claim 2, wherein the temperature of the melt is found at 800° C. to 1200° C. and is held at a temperature of 320° to 500° C. for 6 to 24 hours.

5. A method for the production of platelike, finely divided, alkaline-earth ferrites or lead ferrites for memory cores having the formula:

$$AFe_{12-x-y}M_xSn_yO_{19}$$

in which formula:
A = Ba and/or Sr,
M = Co and/or Ti,
x = 0 to 3
y = 0 to 1
comprising dissolving the corresponding crude ferrite or impure, ceramic raw material in an alkali at elevated temperature to form a decomposition molten melt with an alkali compound in excess, dissolving the melt in water to obtain a precursor, filtering off said precursor and annealing the precursor thereby obtained, at temperatures between 600° and 950° C. for 0.5 to 6 hours.

6. The method according to claim 5, wherein the crude ferrite has the formula $BaFe_{11}Co_{0.5}Ti_{0.5}O_{19}$ and sodium hydroxide in a sufficient amount is used to form a molten melt at 800° C. and to decompose said crude ferrite, maintaining the melt for 6 hours at 500° C., dissolving the melt, in water, filtering off the ferrite precursor formed thereby, and annealing for 1 hour at 900° C.

7. The method according to claim 5, wherein the ceramic raw material is a mixture of 79 g $Fe_2O_3$, 17.76 g $BaCO_3$, 3.61 g $Co_3O_4$, 3.59 g $TiO_2$, and sodium hydroxide as alkali compound used in a sufficient amount to form a molten melt at 800° C. and to decompose said ceramic raw material, maintaining the melt for 6 hours at 500° C., dissolving the melt in water, filtering off the precursor formed thereby and annealing for 1 hour at 900° C.

8. The method according to claim 6, wherein the melt is dissolved in water and the suspension obtained thereby is treated 6 hours at 190° C. in an autoclave, and after filtering the ferrite precursor is subjected to a two-hour annealed at 900° C.

9. The method according to claim 6, wherein the melt is annealed for 6 hours at 320° C.

10. The method according to claim 7, wherein the melt is annealed for 6 hours at 320° C.

11. The method according to claim 5, wherein impure strontium ferrite with the composition $SrFe_{11}O_{19}$ or a respective composition obtained by mixing of the starting material $SrCo_3$ and $Fe_2O_3$ is used, melting is carried out with sodium carbonate at 1200° C. to form a molten melt, thereafter dissolving the melt in water, heating at 240° C. in an autoclave for 6 hours, separating ferrite precursor formed thereby and annealing for 6 hours at 950° C.

* * * * *